United States Patent [19]
Enoki

[11] Patent Number: 6,035,359
[45] Date of Patent: Mar. 7, 2000

[54] METHOD AND SYSTEM FOR CONTROLLING MESSAGE DISPLAY UPON INSERTION AND REMOVAL OF A PC CARD INTO AND FROM A COMPUTER SYSTEM

[75] Inventor: Atsuya Enoki, Hokkaido, Japan

[73] Assignee: NEC Corporation, Tokyo, Japan

[21] Appl. No.: 09/086,569

[22] Filed: May 29, 1998

[30] Foreign Application Priority Data

May 30, 1997 [JP] Japan .................................. 9-141548

[51] Int. Cl.⁷ ................................................. G06F 13/00
[52] U.S. Cl. ........................................................ 710/103
[58] Field of Search ................................ 710/103, 102, 710/104, 8, 10, 13

[56] References Cited

U.S. PATENT DOCUMENTS 5,671,368  9/1997  Chan et al. .............................. 710/102
5,758,103  5/1998  Oh ........................................... 710/103
5,781,798  7/1998  Beatty et al. ............................ 710/10

Primary Examiner—Glenn A. Auve
Attorney, Agent, or Firm—Sughrue, Mion, Zinn, Macpeak & Seas, PLLC

[57] ABSTRACT

In a message display control method for use in a computer system in controlling a message display upon insertion and removal of a PC (personal computer) card (17) into and from the computer system, the message display control method includes the steps of: setting a message flag in response to a PC card insertion event which occurs when the PC card is inserted into the computer system; executing a display of a message in response to the message flag; waiting a key event which occurs when a predetermined input operation is carried out in the computer system with the message displayed; closing the message in response to the key event; clearing the message flag in response to the key event; judging, in response to a PC card removal event which occurs when the PC card is removed from the computer system, whether or not the message flag is set; and setting, when the judging step judges in response to the PC card removal event that the message flag is set, the key event to forcedly close the message and to forcedly clear the message flag. Typically, the message display control method is carried out in a PC card control section 142 of a RAM 14 of the computer system.

6 Claims, 2 Drawing Sheets

METHOD AND SYSTEM FOR CONTROLLING MESSAGE DISPLAY UPON INSERTION AND REMOVAL OF A PC CARD INTO AND FROM A COMPUTER SYSTEM

BACKGROUND OF THE INVENTION

This invention relates to an operating system of a computer system and, in particular, to a method and a system for controlling a message display upon insertion and removal of a PC card into and from the computer system.

A computer system of the type described is typically a personal computer (PC) system. In recent years, the personal computer (PC) system is often equipped with a PC card slot for receiving a PC card which is used in expanding the functionality of the personal computer system. In particular, in portable information apparatuses called PDAs (Personal Data Assistants), the PC card slot is essential in order to expand functionality without sacrificing portability.

Generally, an operating system of the computer system with the PC card slot is programmed so that, when the PC card is inserted into the PC card slot (or when the PC card is removed from the PC card slot), a message is displayed to notify a user of a change in the status of the PC card slot. By way of example, "Windows", developed by Microsoft Inc., U.S.A. and dominating the market as an operating system of personal computers, adopts a socket service interface standardized by PCMCIA (Personal Computer Memory Card International Association) to display the message in a rectangular window called a message box when the state of the PC card slot is changed.

However, the above-mentioned window is not closed unless the user executes a predetermined input operation (for example, he clicks a button on the window by the use of a mouse or he presses a specific key on a keyboard for closing the window). This results in a problem that the state of the PC card slot and the message being displayed are not coincident.

SUMMARY OF THE INVENTION

It is therefore an object of this invention to provide a message display control method and a message display control system capable of avoiding a mismatch between the state of a PC card slot and the content of a message being displayed in a window by automatically closing the window when the state of the PC card slot is changed while the window is being displayed.

A message display control method to which this invention is applicable is for use in a computer system in controlling the display of a message of PC card slot status upon insertion and removal of a PC (personal computer) card into and from the computer system.

According to this invention, the message display control method comprises the steps of; setting a message flag in response to a PC card insertion event which occurs when the PC card is inserted into the computer system; executing a display of a status message in response to the message flag; waiting for a key event which occurs when a predetermined input operation is carried out in the computer system while the message is displayed; closing the status message in response to the key event; clearing the message flag in response to the key event; judging, in response to a PC card removal event which occurs when the PC card is removed from the computer system, whether or not the message flag is set; and setting, when the judging step judges in response to the PC card removal event that the message flag is set, the key event to close the status message and to clear the message flag.

A message display control system to which this invention is applicable is for use in a computer system in controlling a message display upon insertion and removal of a PC (personal computer) card into and from the computer system.

According to this invention, the message display control system comprises: flag setting means for setting a message flag in response to a PC card insertion event which occurs when the PC card is inserted into the computer system; display executing a means for executing display of a message in response to the message flag; waiting means for waiting for a key event which occurs when a predetermined input operation is carried out in the computer system with the message displayed; closing means for closing the message in response to the key event; clearing means for clearing the message flag in response to the key event; judging means for judging, in response to a PC card removal event which occurs when the PC card is removed from the computer system, whether or not the message flag is set; and event setting means for setting, when the judging means judges in response to the PC card removal event that the message flag is set, the key event to close the status message and to clear the message flag.

Thus, upon occurrence of the PC card removal event, the message is closed by setting the key event if the message flag is set. It is therefore possible according to this invention to avoid the lack of coincidence between the state of the PC card slot and the message being displayed.

DESCRIPTION OF THE PREFERRED EMBODIMENT

Figure 1:
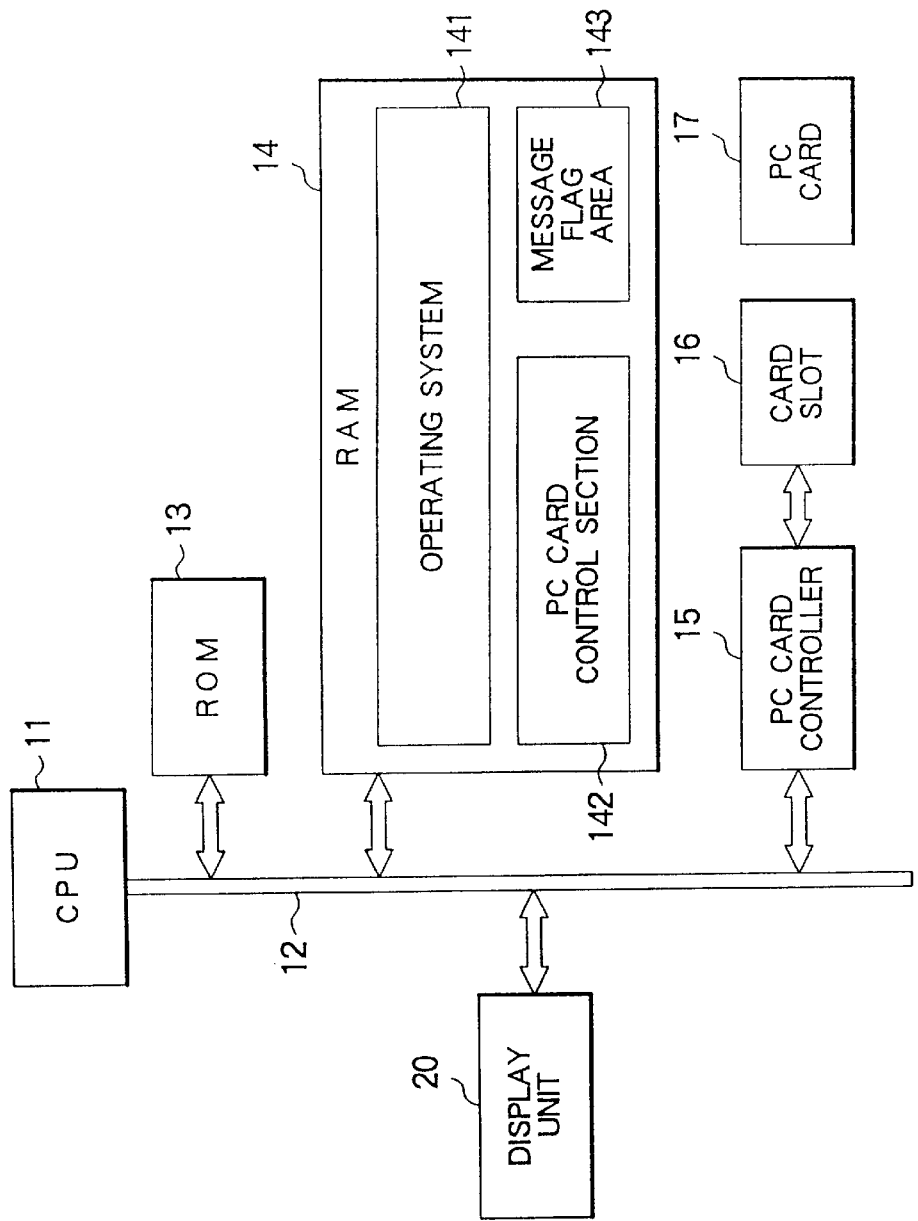
FIG. 1 is a block diagram of a control system according to an embodiment of this invention.

Now, this invention will be described in detail with reference to the drawing.

Referring to FIG. 1, a message display control system according to this invention is applied to an information processing system. In the information processing system being illustrated, a CPU (central processing unit) 11 is connected through a system bus 12 to an ROM (read-only memory) 13 storing a program, an RAM (random access memory) 14 for memorizing the program read from the ROM 13, a PC card controller 15, and a display unit 20. A card slot 16 is connected to the PC card controller 15. The CPU 11 is a typical central processing unit and starts execution from a predetermined address in the ROM 13 in response to power supply or the event of a reset signal. The ROM 13 is a read-only memory and memorizes an operating system and PC card control software. The RAM 14 is a random access memory for reading the operating system and the PC card control software from the ROM 13 and for storing the operating system and the PC card control software as an operating system 141 and a PC card control section 142. The RAM 14 further has a message flag area 143. The card slot 16 is for insertion and removal of a PC card 17. The PC card controller 15 serves to control the card slot 16. In this event, the PC card controller 15 produces a PC card insertion event when the PC card is inserted into the card slot 16. When the PC card is removed from the card slot 16, the PC card controller 15 produces a PC card removal event.

Next, operation upon insertion of the PC card 17 into the card slot 16 will be described. When the PC card 17 is inserted into the card slot 16, the PC card controller 15 notifies as an interruption for the PC card insertion event to the CPU 11 through the system bus 12. Notified of the interruption for the PC card insertion event, the CPU 11 in turn notifies the interruption for the PC card insertion event to the operating system 141 memorized in the RAM 14. Then, the operating system 141 notifies the PC card insertion event to the PC card control section 142.

Figures 2, 3:
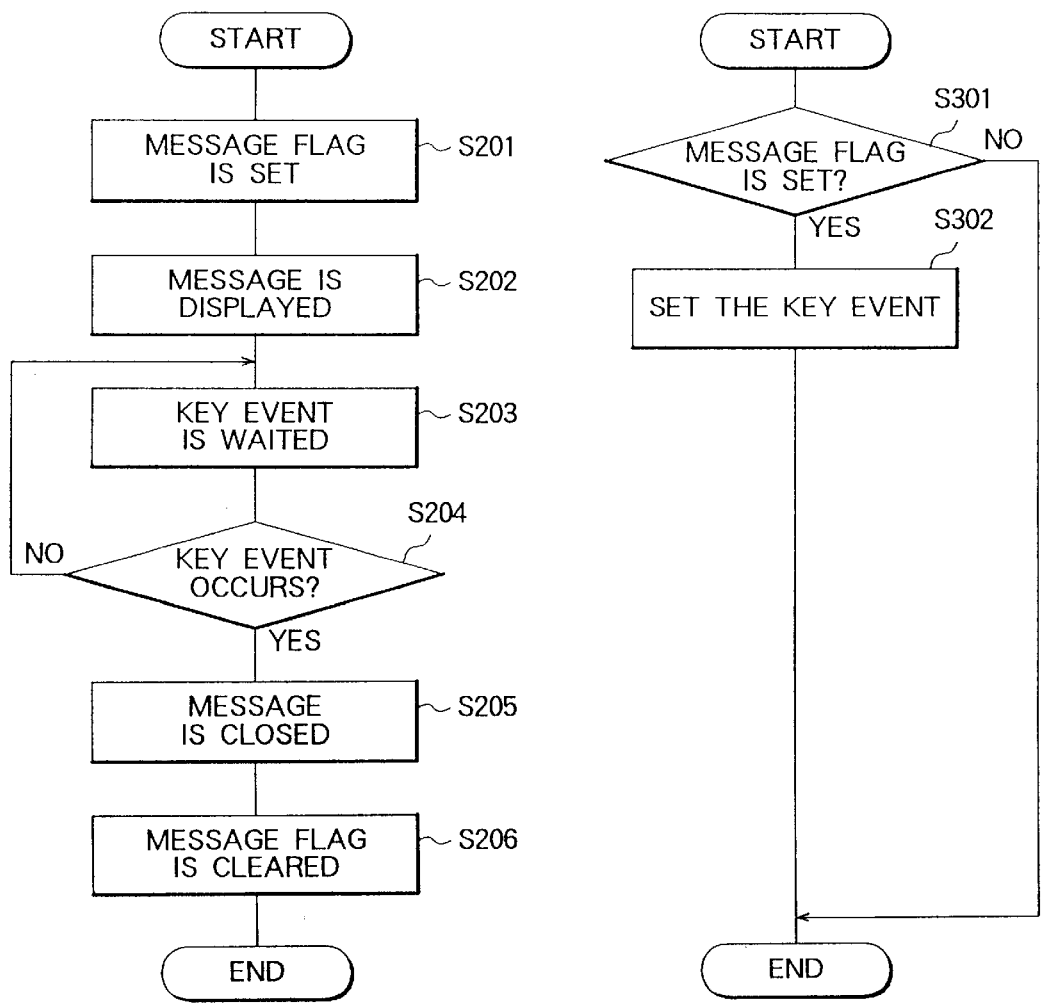
FIG. 2 is a flow chart for use in describing an operation of a PC card control section of a RAM of the control system of FIG. 1 when a PC card is inserted into the control system.
FIG. 3 is a flow chart for use in describing another operation of the PC card control section of a RAM of the control system of FIG. 1 when the PC card is removed from the control system.

FIG. 2 is a flow chart for use in describing an operation of the PC card control section 142 of the RAM 14 of the control system of FIG. 1 when the PC card 17 is inserted into the control system.

Referring to FIG. 2, when the PC card insertion event is notified as a notified event, the PC card control section 142 sets a message flag in the message flag area 143 when the notified event is the PC card insertion event (S201). Then, the PC card control section 142 makes the display unit 20 display a message indicating the insertion of the PC card (S202). The message is displayed in, for example, a rectangular window which is described above. The occurance of a key event is awaited (S203). The key event occurs when the user carries out a predetermined input operation which is also described above. That is, the key event occurs when the user clicks a button on the window by the use of a mouse or when the user presses a specific key on a keyboard for closing the window. Upon occurrence of the key event (S204), the message is erased or closed (S204) and the message flag is cleared (S205).

FIG. 3 is a flow chart for use in describing another operation of the PC card control section 142 of the RAM 14 of the control system of FIG. 1 when the PC card 17 is removed from the control system. When the PC card 17 is removed from the card slot 16, the PC card removal event is produced from the PC card controller 15 and is notified as the notified event to the PC card control section 142 like the PC card removal event.

Referring to FIG. 3, when the notified event is not the PC card insertion event (namely, when the notified event is the PC card removal event), a judgement is made about whether or not the message flag is set in the message flag area 143 (S301). If the message flag is set, the PC card control section 142 sets the key event to close the status message and to clear the message flag (S302). If not, the operation comes to an end.

According to this invention, the message indicating the insertion of the PC card is erased upon removal of the PC card. Thus, it is possible to avoid the lack of coincidence between the state of the PC card slot and the message being displayed.

What is claimed is:

1. A message display control method for use in a computer system in controlling a message display upon insertion and removal of a PC (personal computer) card into and from said computer system, said message display control method comprising the steps of:

setting a message flag in response to a PC card insertion event which occurs when said PC card is inserted into said computer system;

executing a display of a status message in response to said message flag;

waiting for a key event, which occurs when a predetermined input operation is carried out in said computer system with said status message displayed;

discontinuing display of said status message in response to said key event;

clearing said message flag in response to said key event;

judging, in response to a PC card removal event, which occurs when said PC card is removed from said computer system, whether said message flag is set; and initiating, when said judging step determines in response to said PC card removal event that said message flag is set, said key event to discontinue display of said status message and to clear said message flag.

2. A message display control method as claimed in claim 1, wherein:

said computer system comprises a card slot;

said PC card insertion event occurs when said PC card is inserted into said card slot;

said PC card removal event occurs when said PC card is removed from said card slot.

3. A message display control system for use in a computer system in controlling a message display upon insertion and removal of a PC (personal computer) card into and from said computer system, said message display control system comprising:

flag setting means for setting a message flag in response to a PC card insertion event which occurs when said PC card is inserted into said computer system;

display executing means for executing display of a status message in response to said message flag;

waiting means for waiting for a key event, which occurs when a predetermined input operation is carried out in said computer system with said status message displayed;

closing means for discontinuing display of said status message in response to said key event;

judging means for judging, in response to a PC card removal event, which occurs when said PC card is removed from said computer system, whether said message flag is set; and event setting means for initiating, when said judging means judges in response to said PC card removal event that said message flag is set, said key event to discontinue display of said status message and to clear said message flag.

4. A message display control system as claimed in claim 3, wherein:

said computer system comprises a card slot;

said PC card insertion event occurs when said PC card is inserted into said card slot;

said PC card removal event occurs when said PC card is removed from said card slot.

5. A message display control system as claimed in claim 4, wherein:

said computer system further comprises a PC card controller connected to said card slot for producing said PC card insertion event when said PC card is inserted into said card slot and for producing said PC card removal event when said PC card is removed from said card slot.

6. A message display control system as claimed in claim 5, wherein:

said computer system further comprises a system bus, a CPU (central processing unit) connected to said system bus, and a RAM (random access memory) connected to said system bus and having an operating system and a PC card control section;

said PC card controller is connected to said system bus to report each said PC card insertion event and said PC card removal event as an interruption to said CPU through said system bus;

said CPU reports each said PC card insertion event and said PC card removal event to said operating system of said RAM through said system bus;

said operating system reports each said PC card insertion event and said PC card removal event to said PC card control section of said RAM;

said message display control system comprising, in said PC card control section, said flag setting means, said display executing means, said waiting means, said closing means, said clearing means, said judging means, and said event forcing means.

* * * * *